Figure 1:
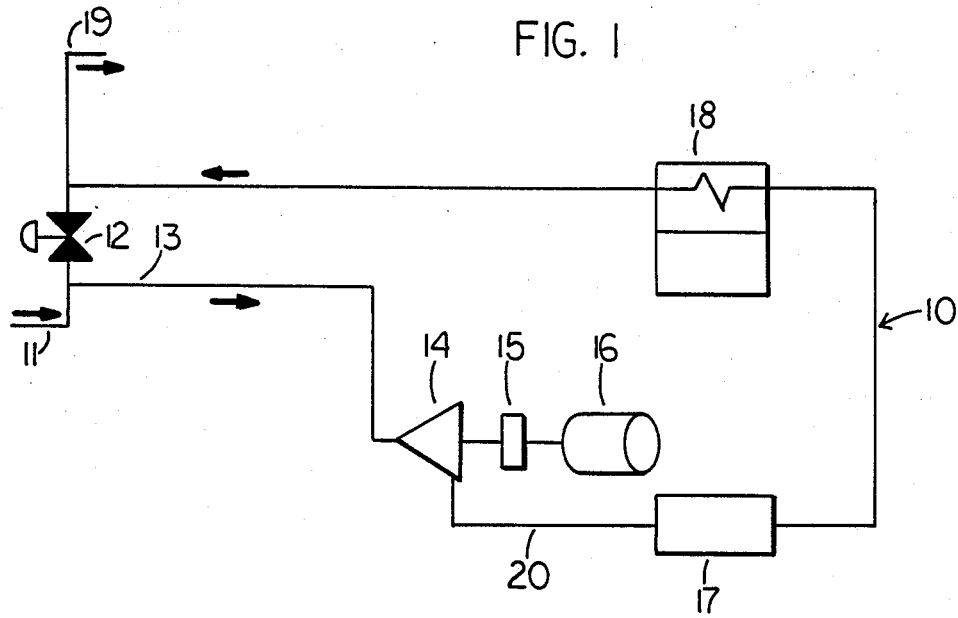

United States Patent

Letarte

Patent Number: 4,920,749
Date of Patent: May 1, 1990

[54] METHOD OF AND MEANS FOR PRODUCING ELECTRICITY

[76] Inventor: John R. Letarte, 21 Juniper Ridge, Shelburne, Vt. 05482

[21] Appl. No.: 397,862

[22] Filed: Aug. 24, 1989

[51] Int. Cl.⁵ ............................................. F01K 25/10
[52] U.S. Cl. ........................................ 60/648; 60/659; 62/238.7; 62/238.6
[58] Field of Search .............. 165/10 A, 18; 62/238.6, 62/238.7; 60/648, 659

[56] References Cited

U.S. PATENT DOCUMENTS

| | | | |
|---|---|---|---|
| 2,713,252 | 7/1955 | Jackson et al. | 165/18 |
| 4,258,696 | 3/1981 | Gopal | 165/10 A |
| 4,406,136 | 9/1983 | Picchiottino | 165/18 X |
| 4,446,910 | 5/1984 | Miller et al. | 165/10 A |

Primary Examiner—Allen M. Ostrager
Attorney, Agent, or Firm—Thomas N. Neiman

[57] ABSTRACT

The improved method produces electricity by capturing energy normally wasted when natural gas is reduced in pressure. The improved device includes a heat addition and thermal energy storage system that includes an intermittent heat pump for use at pre-determined periods of time to add heat to an energy storage device. The energy storage device and an optional supplemental heater are used to maintain a satisfactory gas temperature downwstream of the process.

2 Claims, 1 Drawing Sheet

METHOD OF AND MEANS FOR PRODUCING ELECTRICITY

This invention pertains to electricity production, and in particular to such electricity production methods and means necessary to capture energy normally wasted when natural gas is reduced in pressure.

The use of expansion devices such as steam turbines and turboexpanders that drive a generator through a gearbox and produce electricity using the natural gas pressure differential normally maintained using a pressure reducing valve has been known in the prior art. Additionally, the combustion of fuel such as natural gas to maintain an acceptable natural gas temperature (35 to 45 degrees F.) downstream of the natural gas pressure reduction process is also known, as is the use of a heat pump to provide a continuous source of heat to maintain an acceptable natural gas temperature downstream of the natural gas pressure reduction process.

The consumption of non-renewable fuels is limited to no more than 25 percent of the power generation process heat input for projects wishing to become Small Power Producer Qualifying Facilities (QF's) as defined by the Public Utility Regulatory Policies Act. Economic realities and institutional barriers have prevented significant development of projects incorporating the previously discussed technologies, primarily because such technologies have not taken into account the premium paid for electricity produced during hours of peak demand.

What is needed is a system that uses a relatively inexpensive source of off-peak energy to supply most of the heat required to maintain an acceptable natural gas temperature downstream of the process. It is also the object of this invention to teach the means for and a method of producing electricity which limits the use of non-renewable fuels, which will allow the process to be eligible for QF status in order to enhance commercial prospects.

It is an object of the invention to teach a method of producing electricity, for use when a gas is reduced in pressure through a sequential process, comprising the steps of expanding the gas to maintain a desired pressure level using an expansion device, gearbox and generator designed to convert a portion of the energy available from isentropic expansion of said gas to electricity; warming said gas by circulating fluid between a heat exchanger that warms the gas and a second heat exchanger that absorbs heat from a thermal storage medium heated by an intermittent heat pump; and further warming of a gas to a desired temperature by the use of an optional supplemental heater as required by design ambient temperature conditions. It is another object of this invention to teach a method of producing electricity, for use when a gas is reduced in pressure through a sequential process, comprising the steps of expanding the gas to a desired pressure level using an expansion device, gearbox and generator designed to convert a portion of the energy available from isentropic expansion of said gas to electricity; warming said gas through direct heat exchange with a thermal storage medium that absorbs heat from an intermittent heat pump; and further warming of said gas to a desired temperature by the use of an optional supplemental heater as required by design ambient temperature conditions.

Finally, it is the object of this invention to teach the means for producing electricity, for use when heating the exhaust of a gas expansion device rotating a gear driven generator, comprising a primary heat exchanging means; said heat exchanging means having a working fluid contained within said heat exchanging means; a secondary heat exchanging means for absorbing heat from a thermal storage unit; said thermal storage unit having at least a single phase thermal storage medium; said thermal storage unit further having an intermittent heat pump; and circulation means for moving said working fluid between said primary and said secondary heat exchanging means.

Figure 2:
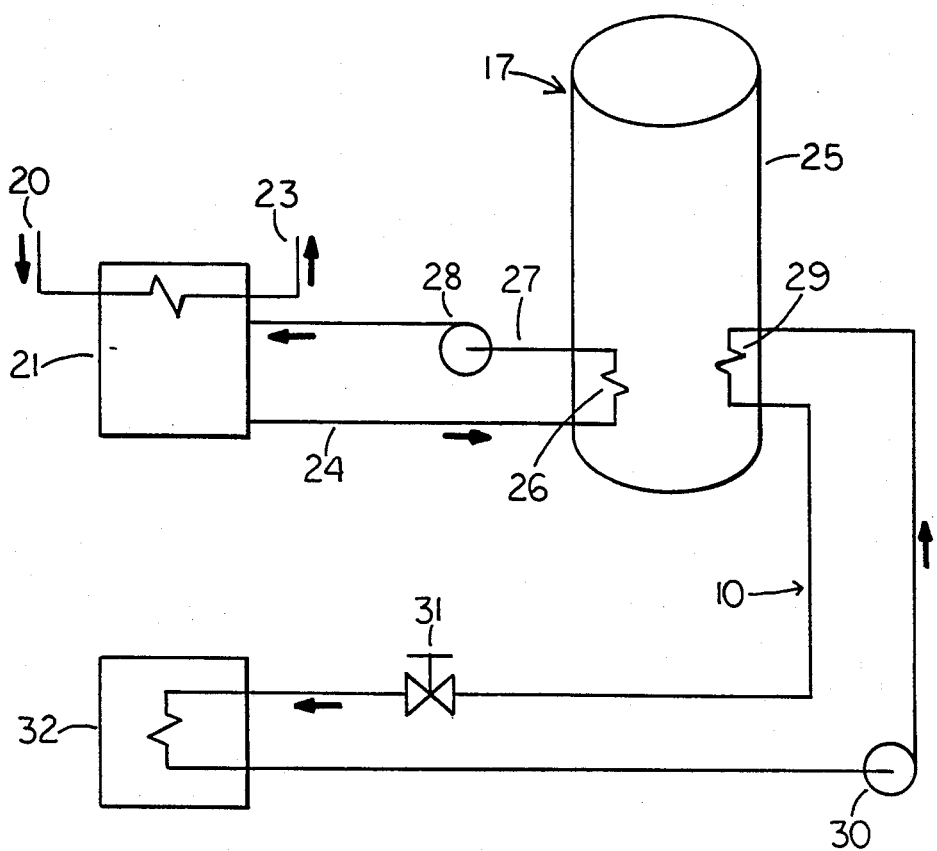

Further objects and features of this invention will become more apparent by reference to the following description taken in conjunction with the accompanying figures, in which:

FIG. 1 is a flow diagram of the novel method of producing electricity by capturing energy normally wasted when the natural gas is reduced in pressure; and FIG. 2 is an expanded flow diagram of the novel means used for heating and storing thermal energy during off-peak hours for use by the novel method during peak hours.

As shown in the figures, the novel method and means 10 comprise the use of all or part of the gas entering the pressure reduction process at 11 by bypassing the pressure reducing valve 12 through a pipe 13 to the inlet of an expansion device 14. The flow of gas to the expansion device 14 is controlled using a pressure regulator to maintain the gas exiting the process at a pressure suitable to the entity receiving the gas at exit line 19. In the event that the gas pressure exiting at the exit line 19 drops below an acceptable value, the pressure reducing valve 12 opens to allow a sufficient amount of gas around the expansion device 14 in order to maintain desired gas pressure in exit line 19.

The expansion device 14 reduces the gas pressure and converts a portion of the potential energy available from the pressure differential across the expansion device 14 to operate a shaft which drives an electric generator 16 through a gearbox 15. The expansion device 14 exhaust is piped to a heat addition and thermal energy storage system 17. From this point in the system, the gas is piped to a supplemental heater 18 which burns natural gas or other suitable fuel which operates, as required, to maintain a gas temperature acceptable to the entity receiving the gas at 19. The optional supplemental heater 18 provides flexibility and improves the heat pump coefficient of performance and capability by permitting a lower temperature differential between gas exiting the heat addition and thermal energy storage system 17 and the source of heat for the heat pump. The supplemental heater 18 may not be required if the ambient temperature is sufficient.

As shown in FIG. 2, piping 20 is provided to transport the gas from the expansion device exhaust 14 to the inlet of the primary heat exchanger 21 which is an integral part of the heat addition and thermal energy storage system 17. The natural gas is heated by a working fluid such as a glycol water mixture prior to exiting the primary heat exchanger through piping 23. The working fluid flows form the primary heat exchanger 21 through piping 24 to the thermal energy storage device 25 where it is heated in a secondary heat exchanger 26. The working fluid is then returned to the primary heat exchanger 21 through piping 27 by means of pump 28.

The thermal energy storage device 25 is a vessel or tank containing a thermal storage medium such as water and ice that is designed to store energy transferred to it from the heat pump condeser 29 during those hours when it is economical to operate the heat pump. Most of these hours occur during the electric purchaser's off-peak hours when electricity is relatively inexpensive. Energy supplied by the heat pump is used to convert the thermal storage medium from a solid toa liquid stage and/or to add sensible heat to the thermal storage medium liquid. This might facilitate the use of mulitple heat addition and thermal energy storage systems. Heat may also be provided to the thermal energy storage device 25 by heating the working fluid with the heat pump condensor.

Heat supplied by the heat pump condenser 29 is provided by circulating a refrigerant using a refrigerant compressor 30 which increases the pressure of the refrigerant vapor that condenses in the condener 29, expands through a restrictive device 31 and is vaporized using heat absorbed from the surroundings of the process in evaporator 32. The refrigerant compressor 30 operates intermittently when electricity is least expensive and most available. Operation of the heat pump may be continous at the design ambient temperature condition.

The method comprises the sequential passage of a gas through an expansion device; a heat addition and thermal energy system; and an optional supplemental heater. The heat addition and thermal energy storage system is a means of heating the gas using off-peak energy to drive the heat pump. A portion of the heat pump's output is stored using the sensible heat associated with the tempeature rise of a liquid; or the latent heat required to convert a solid to a liquid; or both the latent and sensible heat absorbed by the thermal storage medium as it is converted from a solid to a liquid and increased in temperature.

While I have described my invention in connection with specific embodiments thereof, it is clearly to be understood that this is done only by way of example and not as a limitation to the scope of my invention as set forth in the objects thereof and in the appended claims.

I claim:

1. A method of producing electricity, for use when gas is reduced in pressure through a sequential process, comprising the steps of:

expanding the gas to maintain a desired pressure level using an expansion device, gearbox and generator designed to convert a portion of the energy available from isentropic expansion of said gas to electricity;

warming said gas by circulating a working fluid between a heat exchanger that warms the gas and a second heat exchanger that absorbs heat from a thermal storage medium heated by an intermittent heat pump; and further warming of said gas to a desired temperature by the use of an optional supplemental heater as required by design ambient temperature conditions.

2. A method of producing electricity, for use when gas is reduced in pressure through a sequential process, comprising the steps of:

expanding the gas to maintain a desired pressure level using an expansion device, gearbox and generator designed to convert a portion of the energy available from isentropic expansion of said gas to electricity;

warming said gas through direct heat exchange with a thermal storage medium that absorbs heat from an intermittent heat pump; and further warming of said gas to desired temperature by the use of an optional supplemental heater as required by design ambient temperature conditions.

* * * * *